(12) United States Patent
Jessen et al.

(10) Patent No.: US 10,145,607 B2
(45) Date of Patent: Dec. 4, 2018

(54) METHOD FOR OPERATING A REFRIGERATION SYSTEM FOR A CARGO CONTAINER

(71) Applicant: Maersk Container Industry AS, Tinglev (DK)

(72) Inventors: Lars Mou Jessen, Nordborg (DK); Poul Kim Madsen, Loegumkloster (DK)

(73) Assignee: Maersk Container Industry AS, Tinglev (DK)

( * ) Notice: Subject to any disclaimer, the term of this patent is extended or adjusted under 35 U.S.C. 154(b) by 798 days.

(21) Appl. No.: 13/661,463

(22) Filed: Oct. 26, 2012

(65) Prior Publication Data
US 2013/0104578 A1    May 2, 2013

(30) Foreign Application Priority Data
Nov. 2, 2011 (DK) ................................. 2011 00848

(51) Int. Cl.
| | | |
|---|---|---|
| *F25B 49/02* | (2006.01) | |
| *F25D 17/06* | (2006.01) | |
| *F25D 29/00* | (2006.01) | |

(52) U.S. Cl.
CPC ............. *F25D 29/00* (2013.01); *F25D 17/06* (2013.01); *F25B 2600/0251* (2013.01);
(Continued)

(58) Field of Classification Search
CPC .. F25B 1/00; F25B 13/00; F25B 29/00; F25B 2600/112; F25B 49/02; F25B 2600/0253;
(Continued)

(56) References Cited

U.S. PATENT DOCUMENTS

| | | | |
|---|---|---|---|
| 4,663,725 A | 5/1987 | Truckenbrod et al. | |
| 6,725,680 B1 * | 4/2004 | Schenk | .................. F25D 11/02 62/186 |

(Continued)

FOREIGN PATENT DOCUMENTS

| | | |
|---|---|---|
| CN | 2155519 Y | 2/1994 |
| CN | 1121576 A | 5/1996 |

(Continued)

*Primary Examiner* — Jianying Atkisson
*Assistant Examiner* — Meraj A Shaikh
(74) *Attorney, Agent, or Firm* — McCormick, Paulding & Huber LLP

(57) ABSTRACT

A method for operating a refrigeration system in order to perform temperature control of a closed volume is disclosed. The refrigeration system comprising a compressor, a condenser, an expansion device and an evaporator connected in series in a refrigerant flow path. The refrigeration system further comprises one or more fans arranged to cause a flow of air across the evaporator.

The compressor is controlled by switching the compressor on or off in accordance with a measured temperature, $T_{sup}$, of air which has passed across the evaporator and is being supplied to the closed volume, and in order to achieve a set point temperature, $T_{set}$, in the closed volume. During this a compressor switching pattern is determined.

Temperature fluctuations inside the closed volume are minimized, and energy is conserved.

10 Claims, 6 Drawing Sheets

(52) U.S. Cl.
CPC ..... *F25B 2600/112* (2013.01); *F25D 2700/10* (2013.01); *Y02B 30/743* (2013.01)

(58) Field of Classification Search
CPC ...... F25B 2600/0251; F25B 2700/2117; F25B 2700/21173; F25B 49/025; F25B 49/022; F25B 2700/21174; F25D 17/06; F24F 11/06; F24F 11/053; F24F 7/007; F24F 11/0001–11/0079; G05B 23/00; Y02B 30/78; F23N 2033/08
USPC ........ 62/89, 419, 498, 159, 160, 196.4, 208, 62/212, 226–230, 196.1–196.3; 700/275, 700/276; 165/244, 247, 246, 59, 62
See application file for complete search history.

(56) References Cited

U.S. PATENT DOCUMENTS

| | | | |
|---|---|---|---|
| 2003/0045228 A1* | 3/2003 | Johnson | F24F 7/06 454/343 |
| 2003/0182957 A1 | 10/2003 | Hu et al. | |
| 2004/0098993 A1* | 5/2004 | Lee | F25B 13/00 62/160 |
| 2005/0194125 A1* | 9/2005 | Asai | B60H 1/00864 165/202 |
| 2006/0091229 A1* | 5/2006 | Bash | F24F 11/0012 236/49.3 |
| 2006/0117769 A1* | 6/2006 | Helt | F24F 11/0001 62/161 |
| 2007/0022771 A1* | 2/2007 | Pham | A47F 3/04 62/228.3 |
| 2008/0108295 A1* | 5/2008 | Fischer | F24F 3/1423 454/239 |
| 2008/0245085 A1 | 10/2008 | Jaffer | |
| 2008/0289347 A1* | 11/2008 | Kadle | B60H 1/00735 62/226 |
| 2010/0101770 A1* | 4/2010 | Thogersen | F25B 29/003 165/246 |
| 2010/0106303 A1* | 4/2010 | Thogersen | F25D 29/003 700/275 |
| 2010/0192618 A1 | 8/2010 | Zolli et al. | |
| 2010/0202770 A1 | 8/2010 | Kihara et al. | |
| 2011/0264274 A1* | 10/2011 | Grabinger | F24F 11/0001 700/276 |
| 2012/0090337 A1* | 4/2012 | Chen | F25B 30/02 62/79 |
| 2012/0111044 A1* | 5/2012 | Chen | B60H 1/3232 62/207 |

FOREIGN PATENT DOCUMENTS

| | | | |
|---|---|---|---|
| CN | 1455193 A | 11/2003 | |
| CN | 101137876 A | 3/2008 | |
| CN | 101464032 A | 6/2009 | |
| CN | 101571312 A | 11/2009 | |
| CN | 101846413 A | 9/2010 | |
| CN | 201621816 U | 11/2010 | |
| DE | 102009000665 A1 | 8/2010 | |
| EP | 1857758 A2 | 11/2007 | |
| KR | 20040023132 A * | 3/2004 | ................ F24F 3/14 |

* cited by examiner

METHOD FOR OPERATING A REFRIGERATION SYSTEM FOR A CARGO CONTAINER

CROSS REFERENCE TO RELATED APPLICATION

Applicants hereby claim foreign priority benefits under U.S.C. § 119 from Danish Patent Application No. PA 2011 00848 filed on Nov. 2, 2011, the contents of which are incorporated by reference herein.

FIELD OF THE INVENTION

The present invention relates to a method for controlling a refrigeration system. The method of the invention is particularly suited for controlling a refrigeration system for a container for cargo which must be stored at a substantially constant temperature within a narrow temperature range.

BACKGROUND OF THE INVENTION

When cargo is transported over large distances, the transporting time is often long, and the ambient conditions, such as outdoor temperature and weather conditions may change significantly. Accordingly, when transporting temperature sensitive cargo, it is necessary to be able to control the temperature in the cargo container in such a manner that the temperature of the cargo does not become lower or higher than a specified acceptable temperature range. To this end some cargo containers are equipped with a refrigeration system for controlling the temperature inside the cargo container. It has previously been attempted to reduce the energy consumption of such refrigeration systems. The consequence has been that the fluctuations of the temperature inside the refrigerated volume have increased, i.e. the temperature control has become less accurate than is the case in the high energy consumption systems. Accordingly, it is necessary to choose between low energy consumption or good and accurate temperature control.

US 2010/0101770 A1 discloses a method for operating a refrigeration system for a container for refrigerating chilled cargo. The method includes determining the temperature of supply air discharged into the container and the return air from the container, determining one of a requirement for heating and a requirement for cooling based on the temperatures of the return air and the supply air, activating the evaporator fan when a requirement for heating is determined and increasing the speed of the evaporator fan when increased heating is determined, and activating the compressor and the evaporator fan when a requirement for cooling is determined and increasing the power supplied to the compressor and maintaining the evaporator fan at a first speed when increased cooling is determined. Thus, in the method disclosed in US 2010/0101770 A1 the speed of the evaporator fan is controlled on the basis of the measured temperatures.

US 2010/0106303 A1 discloses a method for operating a refrigeration system for a container to pull down the temperature of cargo from an ambient temperature to a predetermined set-point temperature. Initially, an evaporator fan is operated at a first speed to supply refrigerated supply air from an evaporator to the cargo within the container. The method comprises sensing the temperature of the supply air, comparing the temperature of the supply air with a predetermined set-point temperature, and increasing the speed of the evaporator fan to a second speed faster than the first speed when the temperature of the supply air is lower than the predetermined set-point temperature to maintain the temperature of the supply air at the predetermined set-point temperature. Thus, in the method disclosed in US 2010/0106303 A1 the speed of the evaporator fan is controlled on the basis of the measured supply air temperature.

SUMMARY OF THE INVENTION

It is an object of embodiments of the invention to provide a method for operating a refrigeration system, in which it is possible to maintain a temperature in a refrigerated volume at a substantially constant temperature.

It is a further object of embodiments of the invention to provide a method for operating a refrigeration system, in which the energy consumption is reduced as compared to prior art methods.

It is an even further object of embodiments of the invention to provide a method for operating a refrigeration system, in which a low energy consumption is obtained, while maintaining a good temperature control.

The invention provides a method for operating a refrigeration system in order to perform temperature control of a closed volume, the refrigeration system comprising a compressor, a condenser, an expansion device and an evaporator connected in series in a refrigerant flow path, the refrigeration system further comprising one or more fans arranged to cause a flow of air across the evaporator, the method comprising the steps of:

controlling the compressor by switching the compressor on or off in accordance with a measured temperature, $T_{sup}$, of air which has passed across the evaporator and is being supplied to the closed volume, and in order to achieve a set point temperature, $T_{set}$, in the closed volume, determining a compressor switching pattern during a predefined time period, based on the step of controlling the compressor, measuring a temperature, $T_{return}$, of air returning from the closed volume to be passed across the evaporator, and calculating a temperature difference, $T_{diff}$, as $T_{diff}=T_{return}-T_{set}$, and in the case that $T_{diff}$ is smaller than a predefined threshold value, controlling the speed of the one or more fans on the basis of the determined compressor switching pattern, and on the basis of $T_{diff}$ and continuing to control the speed of the one or more fans in this manner for a predefined time period.

In the present context the term 'refrigeration system' should be interpreted to mean a system in which a flow of fluid medium, such as refrigerant, circulates and is alternatingly compressed and expanded, thereby providing temperature control in the form of either refrigeration or heating of a closed volume. Thus, the refrigeration system may, e.g., be a system used for household refrigeration, or for refrigeration furniture in a supermarket, an air condition system, a heat pump, etc.

In the present context the term 'closed volume' should be interpreted to mean a volume which is delimited by walls in such a manner that the temperature of air inside the closed volume can be maintained at a level which is different from the temperature level outside the closed volume.

The refrigeration system comprises a compressor, a condenser, an expansion device and an evaporator connected in series in a refrigerant flow path. In the present context the term 'compressor' should be interpreted to cover a single compressor, e.g. a fixed speed compressor, a two stage compressor or a variable speed compressor, as well as a compressor rack comprising two or more individual compressors. Each of the compressors in the compressor rack could be a fixed speed compressor, a two stage compressor or a variable speed compressor. In the case that a two stage compressor is used, an additional expansion and an economizer (closed or open) are connected to the intermediate stage of the compressor.

The expansion device may, e.g., be in the form of an expansion valve which controls the supply of refrigerant to the evaporator.

The evaporator may be in the form of a single evaporator comprising a single evaporator coil or two or more evaporator coils arranged in parallel. As an alternative, the evaporator may comprise two or more evaporators arranged in parallel in the refrigerant path.

The refrigeration system may, e.g., be operated in the following manner. Gaseous refrigerant is compressed in the compressor. The compressed refrigerant is then supplied to the condenser, where it is at least partly condensed. The refrigerant leaving the condenser is at least substantially in a liquid form. The condensed refrigerant is supplied to the expansion device, where it is expanded before being supplied to the evaporator. The refrigerant leaving the expansion device and entering the evaporator is a mixture of gaseous and liquid refrigerant. In the evaporator, the liquid refrigerant is at least partly evaporated before the refrigerant is once again supplied to the compressor, and the cycle is repeated. Heat exchange takes place at the condenser as well as at the evaporator. At the condenser, heat exchange results in heat being rejected from the refrigeration system, and heat exchange with the condenser therefore provides heating for a volume. At the evaporator, heat exchange results in heat being supplied to the refrigeration system, and heat exchange with the evaporator therefore provides refrigeration for a volume.

One or more fans are arranged to cause a flow of air across the evaporator. As described above, heat exchange takes place at the evaporator. Thus, the one or more fans ensure that air is passing the evaporator, and being cooled due to the heat exchange, at an appropriate rate. Each fan may be a fixed speed fan or a variable speed fan.

According to the method of the invention, the compressor is controlled by switching the compressor on or off in accordance with a measured temperature, $T_{sup}$. $T_{sup}$ is the temperature of air which has passed the evaporator and is being supplied to the closed volume. Thus, $T_{sup}$ is the temperature of the refrigerated air which is used for providing refrigeration for the closed volume. The compressor is controlled in order to achieve a set point temperature, $T_{set}$, in the closed volume. $T_{set}$ is a temperature which is required for the goods being stored in the closed volume. Thus, the compressor is controlled on the basis of the refrigeration load of the system.

Based on the step of controlling the compressor, a compressor switching pattern is determined during a predefined time period. Thus, the compressor is controlled as described above during a specific time period, and while the compressor is controlled, it is registered when and for how long the compressor is switched off, and when and for how long the compressor is switched on. This defines the compressor switching pattern during the time period. The predefined time period may be of a specified length, such as 10 minutes, 15 minutes, 20 minutes, 30 minutes, or any other suitable length.

When the compressor switching pattern has been determined, a temperature, $T_{return}$, is measured. $T_{return}$ is the temperature of air returning from the closed volume, and which is to be passed across the evaporator. $T_{return}$ must be expected to be higher than $T_{sup}$, since it must be expected that goods stored in the closed volume heat the air being supplied from the evaporator before the air returns to the evaporator. $T_{return}$ may be measured as a running average over a time period, such as 5 minutes, in order to avoid fluctuations in the measured temperature.

Then a temperature difference, $T_{diff}$, is calculated as $T_{diff}=T_{return}-T_{set}$. Thus $T_{diff}$ is the difference between the temperature of the air returning to the evaporator and the set point temperature. Furthermore, $T_{diff}$ is a measure for the sensible (dry) heat which is delivered from the stored goods. When $T_{diff}$ is large the temperature of the air returning to the evaporator is far from the set point temperature, and when $T_{diff}$ is small the temperature of the air returning to the evaporator is close to the set point temperature. Thus, when $T_{diff}$ is small it is an indication that the temperature inside the closed volume, and the temperature of goods being stored in the closed volume, is at or near the required temperature for the goods in the closed volume. In this case it is not necessary to reduce the temperature further, and it is only necessary to maintain the temperature level. This is less energy consuming than reducing the temperature level, which is necessary in the case that $T_{diff}$ is large.

Accordingly, $T_{diff}$ is compared to a predefined threshold value. The threshold value is selected in such a manner that values below the threshold value indicate that the temperature inside the closed volume is sufficiently close to the set point temperature, while values above the threshold temperature indicate that the temperature inside the closed volume needs to be adjusted.

If the comparison reveals that $T_{diff}$ is smaller than the predefined threshold value, the speed of the one or more fans is controlled on the basis of the previously determined compressor switching pattern, and on the basis of $T_{diff}$. As described above, in this situation the temperature of air inside the closed volume, and the temperature of the goods being stored in the closed volume, is close to the set point temperature, and it is only necessary to maintain the temperature level inside the closed volume. Furthermore, in this situation it is expected that the compressor switching pattern will not change significantly from one time period to a subsequent time period. Therefore, controlling the speed of the one or more fans on the basis of the previously determined compressor switching pattern corresponds to controlling the speed of the one or more fans on the basis of the current compressor switching pattern. Since the compressor switching pattern reflects the refrigeration load, this corresponds to controlling the speed of the one or more fans on the basis of the refrigeration load. Furthermore, using $T_{diff}$ as a control parameter for the speed of the one or more fans is an advantage, because this parameter is stable and provides a steady input signal for the control. The one or more fans are then operated in this manner for a predefined time period. During this the compressor switching pattern may be monitored. When the predefined time period has elapsed, the method steps described above may be repeated, i.e. the one or more fans may then be controlled on the basis of the new compressor switching pattern, and in the basis of $T_{diff}$, if $T_{diff}$ is smaller than the predefined threshold value.

In the situation where the temperature level inside the closed volume only needs to be maintained, the energy consumption of the compressor is very low. Therefore the operation of the one or more fans constitutes a significant part of the total energy consumption of the refrigeration system under these circumstances. Therefore significant energy reductions can be obtained by controlling the speed of the one or more fans in an energy efficient manner. Controlling the speed of the one or more fans on the basis of the compressor switching pattern, and on the basis of $T_{diff}$ ensures that the one or more fans is/are only operated at full speed to the extent that it is necessary to maintain the temperature level inside the closed volume, while maintaining a good control of the temperature, i.e. while minimising temperature fluctuations. Thereby the temperature inside the closed volume, and thereby the temperature of the goods, is maintained at an almost constant level.

Thus, according to the present invention, the speed of the one or more fans is controlled according to a 'normal mode' when the temperature of the return air is far from the set point temperature, and the temperature therefore needs to be reduced further, and the speed of the one or more fans is controlled according to a 'low capacity mode' when the temperature of the return air is close to the set point temperature.

The step of controlling the compressor may comprise switching the compressor on at predefined time intervals, and switching the compressor off when one or more predefined criteria have been fulfilled. According to this embodiment, the compressor is controlled in such a manner that switching cycles are initiated at fixed intervals by switching the compressor on. However, the on-time and the off-time of the switching cycles are variable in the sense that the compressor is switched off when predefined criteria have been fulfilled, and remains switched off for the remaining part of the switching cycle, i.e. until the predefined time interval has lapsed since the compressor was switched on.

The step of controlling the speed of the one or more fans may comprise selecting a switching pattern for each fan, and controlling the speed of each fan in accordance with the selected switching pattern. According to this embodiment, an appropriate switching pattern is selected or calculated for each of the fans, on the basis of the compressor switching pattern and on the basis of $T_{diff}$. Once the switching pattern(s) has/have been selected, the one or more fans is/are controlled in accordance with the switching pattern(s).

The method may further comprise the step of determining a ventilation percentage for the one or more fans, and the step of selecting a switching pattern may be performed on the basis of the determined ventilation percentage. In the present context the term 'ventilation percentage' should be interpreted to mean the fraction of the full capacity of the one or more fans which is required during a time period, such as a compressor switching cycle, or a number of compressor switching cycles. Once this has been determined, a switching pattern for each of the one or more fans, which match these requirements, can be selected. The step of determining a ventilation percentage may comprise determining a total ventilation percentage and subsequently determining a compressor on ventilation percentage and a compressor off ventilation percentage. In this case the compressor on ventilation percentage is the required ventilation percentage during the part of the compressor cycle where the compressor is switched on, and the compressor off ventilation percentage is the required ventilation percentage during the part of the compressor cycle where the compressor is switched off.

According to one embodiment, the compressor on ventilation percentage and the compressor off ventilation percentage may be calculated by means of the formula below.

$$(TV*\text{Total Time}) = (\text{CompON\_VP})*(\text{CompON\_Time}) + (\text{CompOFF\_VP})*(\text{CompOFF\_Time}),$$

where

TV is total ventilation percentage.

Total Time is the total compressor on time plus the total compressor off time during the previous period.

CompON_VP is the compressor on ventilation percentage.

CompON_Time is the compressor on time during the previous period.

CompOFF_VP is the compressor off ventilation percentage.

CompOFF_Time is the compressor off time during the previous period.

The step of determining a ventilation percentage may be performed on the basis of the calculated temperature difference, $T_{diff}$. This may, e.g., be achieved by means of a look-up table or a graph establishing a correspondence between temperature values and ventilation percentage.

According to one embodiment, the ventilation percentage may initially be determined on the basis of $T_{diff}$, and subsequently a switching pattern for the one or more fans may be selected on the basis of the determined compressor switching pattern, and in such a manner that the determined ventilation percentage is obtained.

The step of controlling the speed of the one or more fans may comprise selecting, for each fan, whether the fan is to be switched on or switched off. According to this embodiment, one or more fans may be completely switched off for at least part of a given compressor switching cycle, while one or more fans are switched on, in order to achieve the selected ventilation percentage. Some fans may be switched on during one part of the compressor switching cycle while other fans may be switched on during another part of the compressor switching cycle. Each fan may be operable at one speed, at two or more fixed speeds, or the speed of each fan may be continuously variable.

Alternatively or additionally, the step of controlling the speed of the one or more fans may comprise selecting, for each fan, whether to operate the fan at a fixed high speed or at a reduced speed. According to this embodiment, it is determined, for each fan, whether that fan should be operated at maximum speed or at a lower speed. For instance, each fan may be operable at two different speeds, in which case it may be determined, for each fan, whether that fan should be operated at the high speed, at the low speed or should be switched off, at any given time during a compressor switching cycle, or during a time interval including a number of compressor switching cycles.

As mentioned above, the reduced speed may be a fixed low speed, in which case each fan is operable at two or more fixed speeds. As an alternative, the speed of each fan may be continuously variable, in which case the reduced speed may be selected for each fan in such a manner that the selected ventilation percentage is achieved.

The method may further comprise the steps of:
determining a new compressor switching pattern during the predefined time interval in which the speed of the one or more fans is controlled, and
subsequently controlling the speed of the one or more fans on the basis of the new determined compressor switching pattern, and on the basis of $T_{diff}$.

According to this embodiment, a compressor switching pattern is initially determined, and the speed of the one or more fans operated on the basis of the determined compressor switching pattern, and on the basis of $T_{diff}$ for a predefined time period, as described above. When the predefined time period has elapsed, a new compressor switching pattern has been determined. Then the speed control of the one or more fans is re-evaluated, and possibly adjusted if it turns out that the compressor switching pattern has changed. Thereby it is ensured that the speed of the one or more fans is always controlled on the basis of a compressor switching pattern which has been determined recently. Since the load on the refrigeration system is not expected to change significantly on a short timescale, e.g. within a 20 minutes interval, the compressor switching pattern is also not expected to change significantly on a short time scale. Therefore, controlling the speed of the one or more fans on the basis of a recently determined compressor switching pattern almost corresponds to controlling the speed of the one or more fans on the basis of the current compressor switching pattern. This is an advantage because it allows the speed of the one or more fans to be controlled in such a manner that only the required amount of energy is used, and in such a manner that the temperature fluctuations inside the closed volume are minimised.

The step of measuring a temperature, $T_{return}$, may be performed by means of a sensor arranged adjacent to the evaporator.

The closed volume may be or form part of a cargo container. During transport of cargo containers, the ambient conditions, including the ambient temperature, may change significantly. It is therefore an advantage that a refrigeration system for a cargo container is controlled in accordance with the present invention.

As an alternative, the closed volume may be any other kind of closed volume.

BRIEF DESCRIPTION OF THE DRAWINGS

The invention will now be described in further detail with reference to the accompanying drawings in which.

DETAILED DESCRIPTION

Figure 1:
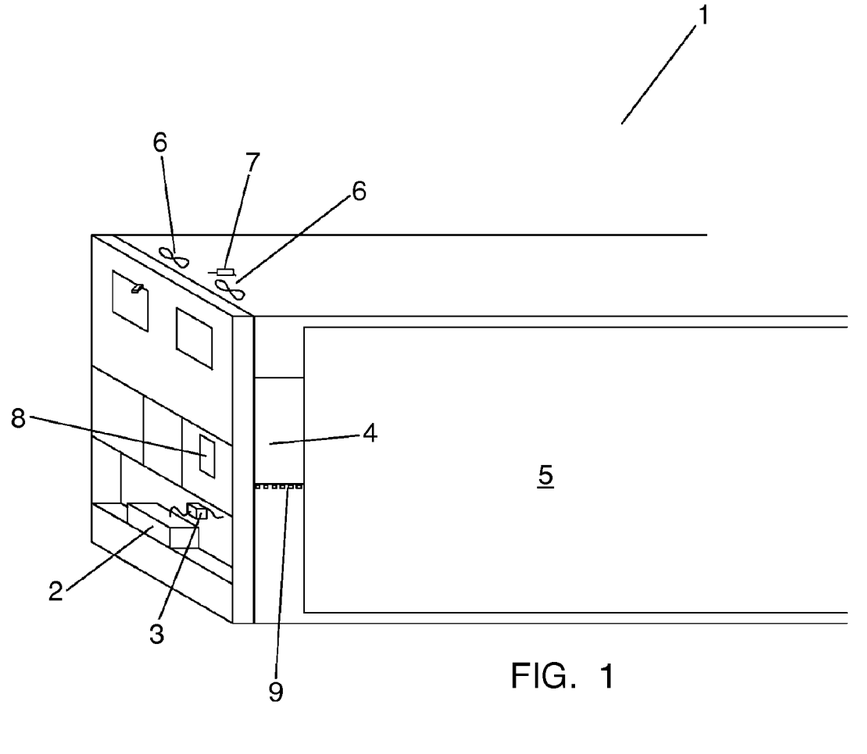
FIG. 1 is a schematic view of a container with a refrigeration system being operated in accordance with a method according to an embodiment of the invention.

FIG. 1 is a schematic view of a cargo container 1 being equipped with a refrigeration system. The refrigeration system comprises a compressor 2, a condenser (not shown), an expansion device in the form of an electronic thermovalve 3, and an evaporator 4. The evaporator 4 is arranged inside a closed volume 5 defined by the cargo container 1, and the refrigeration system is thereby capable of providing refrigeration for the closed volume 5.

A number of fans 6, two of which are shown, are arranged in the closed volume 5 adjacent to the evaporator 5. The fans 6 circulate the air inside the closed volume 5 in such a manner that air is pushed in a direction from the fans 6 towards the evaporator 4, the air thereby passing the evaporator 4 before proceeding into the closed volume 5 and providing cooling for goods stored in the closed volume 5. The air then returns to the region of the fans 6, where it is once again pushed towards and across the evaporator 4.

A temperature sensor 7 is arranged adjacent to the fans 6. Accordingly, the temperature sensor 7 measures the temperature, $T_{return}$, of air returning to the fans 6 and the evaporator 4 from the closed volume 5. As described above, $T_{return}$ is an indication of the temperature of the goods being stored in the closed volume 5. The measured temperature is supplied to a controller 8 which controls the refrigeration system. The controller 8 controls the refrigeration system in accordance with an embodiment of the present invention.

A number of heating elements 9 are arranged on the evaporator 4. The heating elements 9 can be used when defrosting of the evaporator 4 is required. Furthermore, the heating elements 9 may be used for increasing the temperature in the closed volume 5 in the case that the goods being stored in the closed volume 5 must be stored at a temperature which is higher than the ambient temperature.

Figure 2:
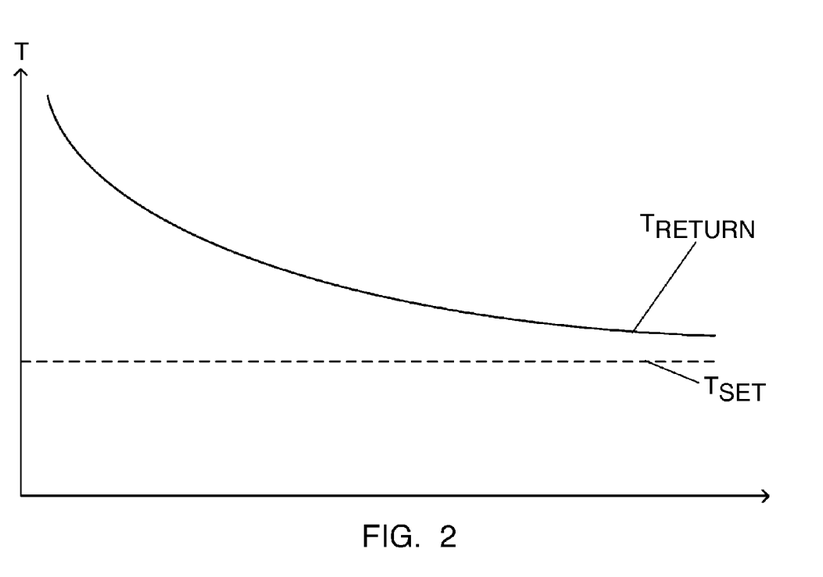
FIG. 2 is graph illustrating temperature of return air as a function of time, during operation of a refrigeration system in accordance with a method according to an embodiment of the invention.

FIG. 2 is graph illustrating temperature of return air, $T_{return}$, as a function of time, during operation of a refrigeration system in accordance with a method according to an embodiment of the invention. $T_{return}$ may advantageously be measured by means of the temperature sensor 7 shown in FIG. 1. It can be seen from the graph of FIG. 2, that $T_{return}$ is initially significantly higher than the set point temperature, $T_{set}$, which is the desired temperature inside the closed volume 5. However, due to the refrigeration provided by the refrigeration system, $T_{return}$ decreases as a function of time, and gradually approaches $T_{set}$.

Figure 3:
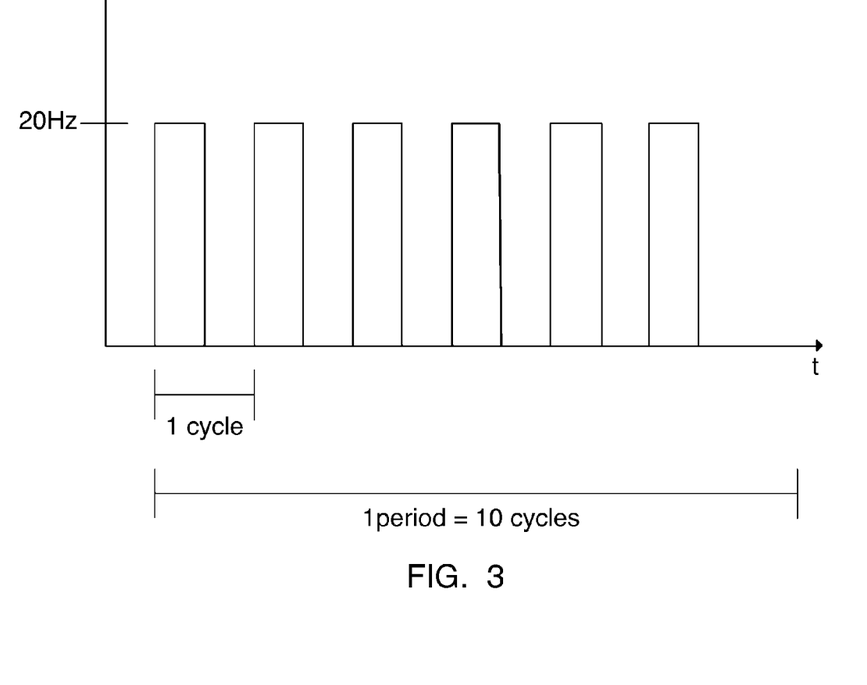
FIG. 3 illustrates a compressor switching pattern.

FIG. 3 illustrates a compressor switching pattern of a compressor forming part of a refrigeration system which is controlled in accordance with a method according to an embodiment of the invention. The refrigeration system may, e.g., be the refrigeration system illustrated in FIG. 1. In FIG. 3 the compressor is switched on at regular intervals, and the time elapsing from the compressor is switched on until the next time the compressor is switched on constitutes one compressor switching cycle. In FIG. 3 it appears that the on-time of the compressor is fixed at substantially half the compressor switching cycle. It should, however, be noted that the on-time of the compressor could be smaller than or larger than half the compressor cycle, and/or that the compressor on-time could vary from one compressor cycle to another. In the latter case the compressor may be switched off when certain criteria are fulfilled, as described above.

In FIG. 3 it is indicated that ten compressor switching cycles constitutes one period. During this period the compressor switching pattern is monitored and determined, and subsequently the speed of the fans of the refrigeration system is controlled on the basis of the determined compressor switching pattern, as described above. This control of the speed of the fans is continued for a subsequent period, i.e. for ten compressor switching cycles. During this time period, the compressor switching pattern is also monitored and determined, and during the subsequent period, the speed of the fans is controlled on the basis of this compressor switching pattern.

Figure 4:
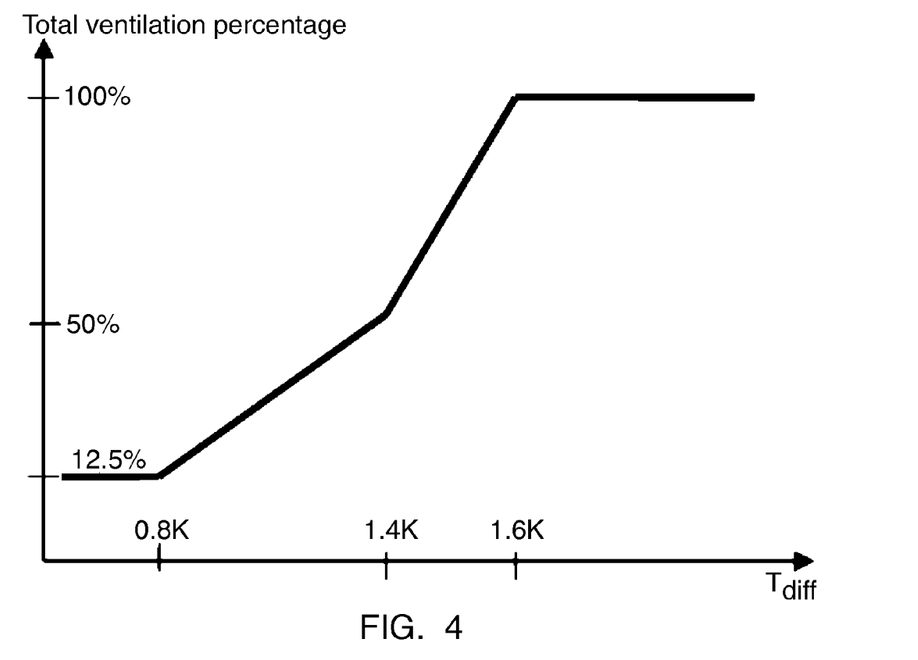
FIG. 4 is a graph illustrating ventilation percentage of evaporator fans as a function of temperature difference between return air and set point temperature.

FIG. 4 is a graph illustrating total ventilation percentage of evaporator fans as a function of the temperature difference, $T_{diff}$, between the temperature of return air, $T_{return}$, and the set point temperature, $T_{set}$. As described above, the total ventilation percentage represents the fraction of the total available ventilation speed of all of the fans, which is required during a specific time period. At low temperature difference, i.e. $T_{diff}$ smaller than 0.8 K, a low total ventilation percentage is required, and a total ventilation percentage of 12.5% is therefore selected. At $T_{diff}$=1.4 K a total ventilation percentage of 50% is required, and at $T_{diff}$=1.6 K and higher temperature differences, all of the fans must be operated at maximum speed, i.e. the total ventilation percentage must be 100%. A linear interpolation is performed between these three fix points, and the resulting curve provides a correspondence between $T_{diff}$ and required total ventilation percentage for all values of $T_{diff}$.

1.6 K is in this case a threshold value in the sense that the speed of the one or more fans is controlled in accordance with a 'normal mode', i.e. at full speed, when the temperature difference is higher than 1.6 K, and the speed of the one or more fans is controlled in accordance with a 'low capacity mode' when the temperature difference is lower than 1.6 K. In the 'low capacity mode' the total ventilation percentage is lower than 100% indicating that at least one of the one or more fans is not operated at full speed.

During operation of a refrigeration system, $T_{return}$ is measured, and $T_{diff}$ is calculated as $T_{diff}=T_{return}-T_{set}$. The graph of FIG. 4 is then used for determining a required total ventilation percentage, based on the calculated temperature difference. Once the total ventilation percentage has been determined in this manner, a switching pattern for the fans can be selected, which ensures that the determined total ventilation percentage is obtained. A given total ventilation percentage can be obtained in a number of ways. For instance, a total ventilation percentage of 50% can be obtained by switching half of the fans off, while operating the remaining fans at full speed. Alternatively, all of the fans may be operated at full speed for half of the time, while being switched off for the remaining part of an operating period. In this case the on-time of the fans may be distributed substantially evenly across the operating period. The fans may be switched on/off simultaneously, or they may be switched on/off sequentially, thereby ensuring that at least one fan is switched on at any time. As another alternative, all of the fans may be operated at half the maximum speed during the entire period. As yet another alternative, any other suitable switching pattern may be selected. In any event, the switching pattern is selected on the basis of a determined compressor switching pattern, as described above.

Figure 5:
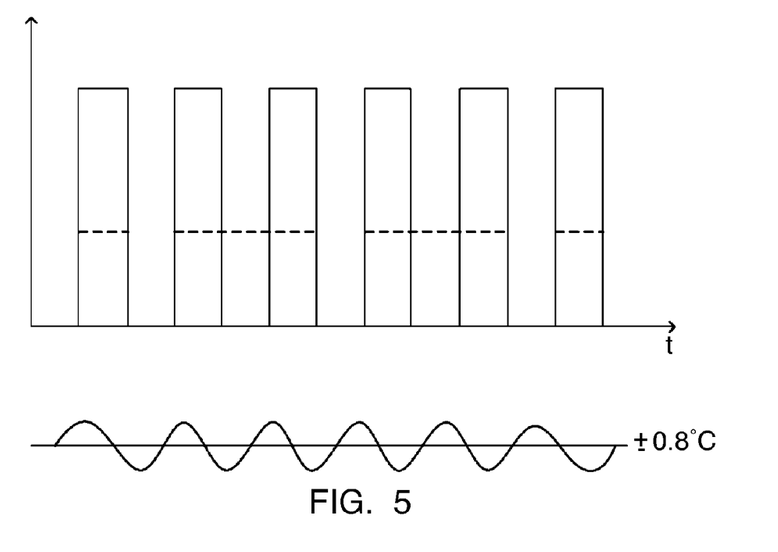
FIG. 5 illustrates a switching pattern for an evaporator fan according to a first embodiment of the invention.

FIG. 5 illustrates a switching pattern for an evaporator fan according to a first embodiment of the invention. The solid line represents the compressor switching pattern, as illustrated in FIG. 3, and the dotted line represents the switching pattern of an evaporator fan. In the embodiment illustrated in FIG. 5, the speed of the fan is controlled in the following manner. During the first compressor switching cycle, the fan is switched on at low speed when the compressor is switched on, and the fan is switched off when the compressor is switched off. During the next compressor switching cycle, the fan is also switched on at low speed when the compressor is switched on. However, when the compressor is switched off, the fan remains switched on, until the compressor is switched off during the subsequent switching cycle. This switching pattern for the fan continues.

The lower graph illustrates fluctuations in $T_{return}$ relative to the set point temperature, $T_{set}$, as a function of time, when the speed of the fans is controlled in accordance with the method illustrated in FIG. 5. It can be seen that $T_{return}$ only deviates from $T_{set}$ by ±0.8° C., i.e. the temperature inside the closed volume is maintained at an almost constant level.

Figure 6:
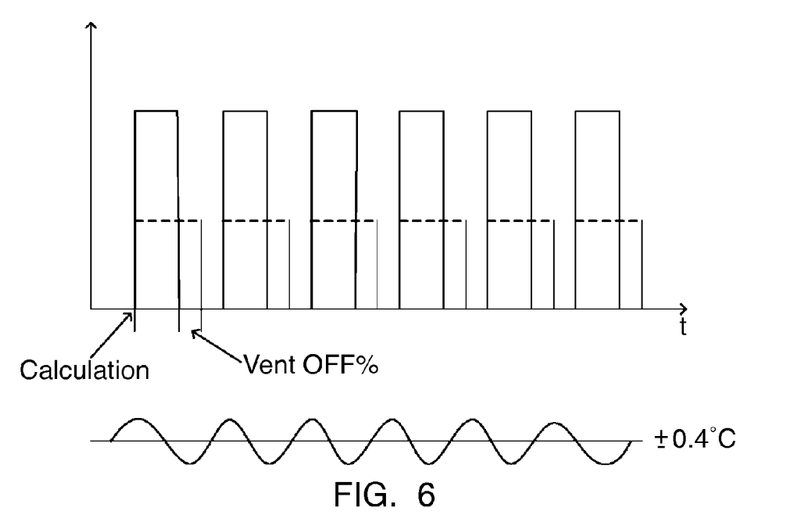
FIG. 6 illustrates a switching pattern for an evaporator fan according to a second embodiment of the invention.

FIG. 6 illustrates a switching pattern for an evaporator fan according to a second embodiment of the invention. The solid line represents the compressor switching pattern, as illustrated in FIG. 3, and the dotted line represents the switching pattern of an evaporator fan. In the embodiment illustrated in FIG. 6, the speed of the fan is controlled in the following manner. Each time a new compressor switching cycle is commenced, i.e. each time the compressor is switched on, the fan is also switched on at low speed. However, when the compressor is switched off, the fan remains switched on for a little while before being switched off.

The lower graph illustrates fluctuations in $T_{return}$ relative to the set point temperature, $T_{set}$, as a function of time, when the speed of the fans is controlled in accordance with the method illustrated in FIG. 6. It can be seen that the fluctuations of $T_{return}$ in this case are even smaller than in the situation illustrated in FIG. 5, in that $T_{return}$ only deviates from $T_{set}$ by ±0.4° C.

Figure 7:
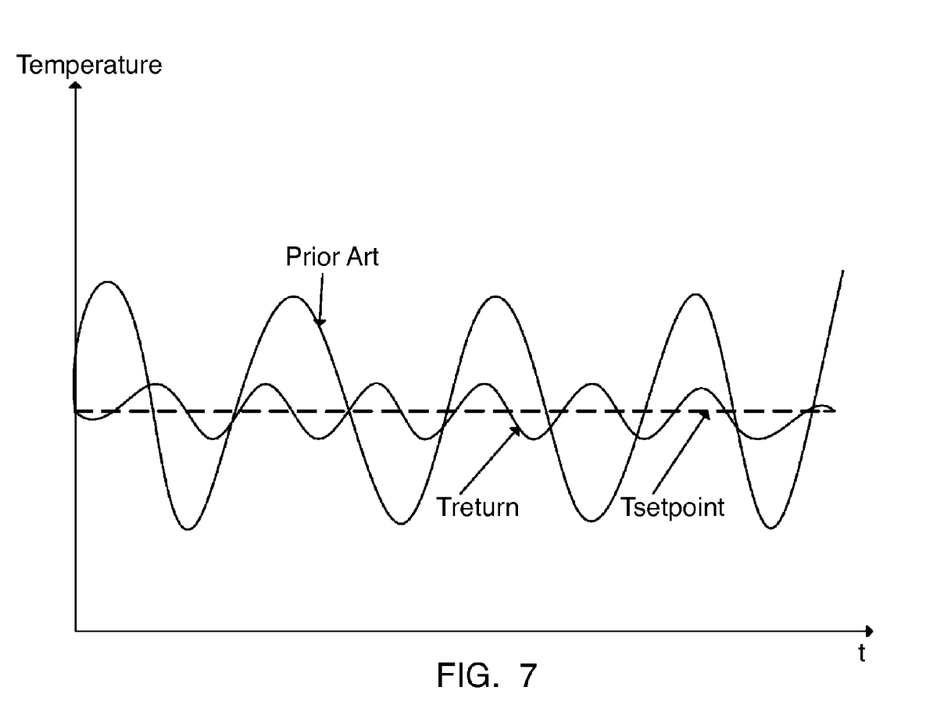
FIG. 7 illustrates temperature fluctuations as a function of time in a refrigerated volume when the refrigeration system is operated according to an embodiment of the invention, and when the refrigeration system is operated according to a prior art method.

FIG. 7 illustrates temperature fluctuations as a function of time in a refrigerated closed volume when the refrigeration system is operated according to an embodiment of the invention, and when the refrigeration system is operated according to a prior art method of the kind in which it has been attempted to reduce the energy consumption of the refrigeration system. It is clear from FIG. 7 that the temperature fluctuations of the prior art method are significantly larger than the temperature fluctuations of the method according to the invention. This is an advantage, since it is thereby possible to maintain the temperature in the closed volume within a very narrow temperature range, and the goods stored in the closed volume are thereby kept at a substantially constant ideal temperature.

While the present invention has been illustrated and described with respect to a particular embodiment thereof, it should be appreciated by those of ordinary skill in the art that various modifications to this invention may be made without departing from the spirit and scope of the present.

What is claimed is:

1. A method for operating a refrigeration system in order to perform temperature control of a closed volume, the refrigeration system comprising a compressor, a condenser, an expansion device and an evaporator connected in series in a refrigerant flow path, the refrigeration system further comprising one or more fans arranged to cause a flow of air across the evaporator, the method comprising the steps of:

controlling the compressor by switching the compressor on or off in accordance with a measured temperature, $T_{sup}$, of air which has passed across the evaporator and is being supplied to the closed volume, and in order to achieve a set point temperature, $T_{set}$, in the closed volume, determining a first compressor switching pattern in a first predefined time period during the step of controlling the compressor, measuring a temperature, $T_{return}$, of air returning from the closed volume to be passed across the evaporator, calculating a temperature difference, $T_{diff}$, as $T_{diff}=T_{return}-T_{set}$, and in the case that $T_{diff}$ is smaller than a predefined threshold value, determining a ventilation percentage on the basis of the calculated temperature difference, $T_{diff}$, selecting a switching pattern for each of the one or more fans on the basis of the determined ventilation percentage, and controlling the speed of the one or more fans for a second predefined time period on the basis of the determined compressor switching pattern corresponding to the first predefined time period and on the basis of $T_{diff}$ and controlling each of the one or more fans for the second predefined time period according to the selected switching pattern, wherein the second predefined time period is subsequent to the first predefined time period, wherein a controller performs the step of determining the ventilation percentage by identifying the ventilation percentage that corresponds to the calculated temperature difference, $T_{diff}$, based on a predetermined relationship between ventilation percentage and calculated temperature difference, $T_{diff}$.

2. The method according to claim 1, wherein the step of controlling the compressor comprises switching the compressor on at predefined time intervals, and switching the compressor off when one or more predefined criteria have been fulfilled.

3. The method according to claim 1, wherein the step of controlling the speed of the one or more fans comprises selecting, for each fan, whether the fan is to be switched on or switched off.

4. The method according to claim 1, wherein the step of controlling the speed of the one or more fans comprises selecting, for each fan, whether to operate the fan at a fixed high speed or at a reduced speed.

5. The method according to claim 4, wherein the reduced speed is a fixed low speed.

6. The method according to claim 1, further comprising the steps of:
determining a second compressor switching pattern during the second predefined time period in which the speed of the one or more fans is controlled, and
controlling the speed of the one or more fans for a third predefined time period on the basis of the second determined compressor switching pattern, and on the basis of $T_{diff}$, wherein the third predefined time period is subsequent to the second predefined time period.

7. The method according to claim 1, wherein the step of measuring a temperature, $T_{return}$, is performed by means of a sensor arranged adjacent to the evaporator.

8. The method according to claim 1, wherein the closed volume is or forms part of a cargo container.

9. The method according to claim 3, wherein the step of controlling the speed of the one or more fans comprises selecting, for each fan, whether to operate the fan at a fixed high speed or at a reduced speed.

10. A method for operating a refrigeration system in order to perform temperature control of a closed volume, the refrigeration system comprising a compressor, a condenser, an expansion device and an evaporator connected in series in a refrigerant flow path, the refrigeration system further comprising one or more fans arranged to cause a flow of air across the evaporator, the method comprising the steps of:

controlling the compressor for a first time by switching the compressor on or off in accordance with a measured temperature, $T_{sup}$, of air which has passed across the evaporator and is being supplied to the closed volume, and in order to achieve a set point temperature, $T_{set}$, in the closed volume, registering for a first time when and for how long the compressor is switched off and/or on during the controlling the compressor for a first time step thereby determining a first compressor switching pattern, wherein the registering for a first time step has a duration in length equal to a first predefined time period;

controlling the compressor for a second time by switching the compressor on or off in accordance with a measured temperature, $T_{sup}$, of air which has passed across the evaporator and is being supplied to the closed volume, and in order to achieve a set point temperature, $T_{set}$, in the closed volume, registering for a second time when and for how long the compressor is switched off and/or on during the controlling the compressor for a second time step thereby determining a second compressor switching pattern, wherein the registering for a second time step has a duration in length equal to a second predefined time period;

measuring a temperature, $T_{return}$, of air returning from the closed volume to be passed across the evaporator, and calculating a temperature difference, $T_{diff}$ as $T_{diff}=T_{return}-T_{set}$, and in the case that $T_{diff}$ is smaller than a predefined threshold value, determining a ventilation percentage on the basis of the calculated temperature difference, $T_{diff}$, selecting a switching pattern for each of the one or more fans on the basis of the determined ventilation percentage, and controlling the speed of the one or more fans for the second predefined time period on the basis of the first determined compressor switching pattern and on the basis of $T_{diff}$ and controlling each of the one or more fans for the second predefined time period according to the selected switching pattern, wherein the second predefined time period is subsequent to the first predefined time period, wherein a controller performs the step of determining the ventilation percentage by identifying the ventilation percentage that corresponds to the calculated temperature difference, $T_{diff}$, based on a predetermined relationship between ventilation percentage and calculated temperature difference, $T_{diff}$.

* * * * *